United States Patent
Bartlett

[11] Patent Number: 6,033,311
[45] Date of Patent: Mar. 7, 2000

[54] CONSTANT VELOCITY RATIO UNIVERSAL JOINT OF THE TRIPODE TYPE

[75] Inventor: Stephen Charles Bartlett, Bridgnorth, United Kingdom

[73] Assignee: GKN Automotive AG, Lohmar, Germany

[21] Appl. No.: 08/981,454

[22] PCT Filed: Jun. 25, 1996

[86] PCT No.: PCT/GB96/01521

§ 371 Date: Dec. 24, 1997

§ 102(e) Date: Dec. 24, 1997

[87] PCT Pub. No.: WO97/02438

PCT Pub. Date: Jan. 23, 1997

[30]    Foreign Application Priority Data

Jul. 4, 1995 [GB] United Kingdom .................. 9513575

[51] Int. Cl.$^7$ ........................................... F16D 3/205
[52] U.S. Cl. ........................................ 464/111; 464/123
[58] Field of Search .................................. 464/111, 112, 464/120, 122, 123, 905

[56]            References Cited

U.S. PATENT DOCUMENTS

| | | | |
|---|---|---|---|
| 4,472,157 | 9/1984 | Sindelar | 464/124 |
| 4,507,100 | 3/1985 | Dore et al. | 464/111 |
| 4,881,923 | 11/1989 | Orain | 464/111 |
| 5,135,438 | 8/1992 | Poulin et al. | 464/905 |
| 5,203,741 | 4/1993 | Turner et al. | 464/905 |
| 5,645,487 | 7/1997 | Lloyd et al. | 464/905 |
| 5,713,797 | 2/1998 | Guimbretiere | 464/111 |
| 5,772,517 | 6/1998 | Guimbretiere | 464/905 |

FOREIGN PATENT DOCUMENTS

| | | | |
|---|---|---|---|
| 453344 | 3/1991 | European Pat. Off. . | |
| 1126828 | 7/1956 | France . | |
| 2224669 | 10/1974 | France . | |
| 2621370 | 4/1989 | France . | |
| 2007016 | 8/1970 | Germany . | |
| 2848125 | 5/1980 | Germany . | |
| 5-288255 | 11/1993 | Japan | 464/111 |
| 452478 | 8/1936 | United Kingdom . | |
| 2106219 | 4/1983 | United Kingdom | 464/111 |
| 93/22577 | 11/1993 | WIPO . | |
| 95/23928 | 9/1995 | WIPO . | |

Primary Examiner—Lynne H. Browne
Assistant Examiner—Greg Binda
Attorney, Agent, or Firm—Robert P. Renke; Artz & Artz

[57]            ABSTRACT

A constant velocity ratio universal joint of the tripode type including a first joint member having a first rotational axis and three tracks circumferentially spaced about the axis and extending lengthwise thereof. A second joint member is also included having a second rotational axis and three arms extending into the respective tracks of the first joint member. Each of the arms has a respective arm axis, and a roller is carried by each arm. Each roller has a roller axis and an external circumferential surface which engages opposite sides of the respective track in the first joint member. The external circumferential surface of each roller is a surface of revolution about the roller axis of a convex generally arcuate line having a meridian radius. The roller is characterized in that the meridian radius is greater than the equatorial radius.

9 Claims, 3 Drawing Sheets

CONSTANT VELOCITY RATIO UNIVERSAL JOINT OF THE TRIPODE TYPE

DESCRIPTION OF INVENTION

This invention relates to a constant velocity ratio universal joint of the tripode type, comprising a first joint member having a rotational axis and three tracks circumferentially spaced about its rotational axis and extending lengthwise thereof; a second joint member having a rotational axis and three arms having respective axes and extending into the tracks in the first joint member; and a respective roller carried by each arm, each roller having an axis and an external circumferential surface which is a surface of revolution about the roller axis and which is engagable with opposite sides of the respective track in the first joint member, the roller being constrained on its respective arm for rotation about the arm axis and movement lengthwise thereof and being able to tilt in its respective track.

Such a tripode joint will hereafter be referred to as a tripode joint of the kind specified.

Hitherto in tripode joints of the kind specified, the external circumferential surface of each roller has been a substantially part-spherical surface, while the opposed sides of each track in the first joint member, engaged by the external circumferential surface of the respective roller, have been part-cylindrical surfaces. The radius of curvature of the part-spherical roller surface has been substantially the same as the radius of curvature of the part-cylindrical track surfaces, although in practice there has been a slight disconformity between the radii of curvature of the track sides and the external circumferential roller surface, so that the area of contact between roller and track side is reduced.

One problem which arises in conventional tripode joints as above described is that when a joint rotates in the articulated condition (i.e. with the rotational axes of the two joint members inclined to one another), axial forces arise between the joint members. Such forces are third order forces, i.e. they are at a frequency of three times the rotational speed of the joint. They increase as the angle of articulation of the joint increases.

The effect of such forces is particularly apparent when the joints are used in the drive shafts of front wheel drive motor vehicles, such joints usually being used as the inboard joints to accommodate, because of their ability for the two joint members to plunge, i.e. move axially relative to one another, the chances in overall length of the drive shafts which occur with vehicle suspension movement. One problem associated with such use of the joints is that of "shudder" wherein the axial forces created by the joint are transmitted to the vehicle structure and can be felt by the vehicle's occupants under certain conditions as a shuddering vibration. Shudder is particularly a problem when a vehicle is accelerating, because the front of the vehicle rises which with most drive train installations increases the angle of articulation of the inboard universal joints of the drive shafts and this, combined with the high torque being transmitted by the joints, exacerbates the problem. The problem tends to be increased in modern passenger cars, where packaging requirements make increased installed articulation angles on the inboard universal joints more likely to be encountered.

There are universal joints wherein shudder is less of a problem than for previously known tripode universal joints of the kind specified, and some such joints are generally of tripode type but with more complex roller assemblies. Such complexity makes the joints expensive to manufacture.

It is broadly the object of the present invention to provide a tripode constant velocity ratio universal joint of the kind specified wherein the above described problem of shudder is overcome or reduced, but at relatively reduced expense compared with the more complex joints involving the presence of additional components.

According to the invention, we provide a tripode constant velocity ratio universal joint of the kind specified, wherein the axes of the arms of the second joint member are inclined to a plane perpendicular to the axis of rotation of the second joint member and/or are offset front the rotational axis of the second joint member, and the external circumferential surface of each roller is a surface of revolution about the roller axis of a convex generally arcuate line whose radius is greater than the equatorial radius of the roller.

Said radius of the generally arcuate line is herein referred to for convenience as the meridian radius of the roller. The equatorial radius of the roller is its greatest radius about the roller axis.

It has been found that by virtue of the above expedients, in combination, the third order axial forces arising between the joint members are reduced thus enabling the problem of shudder also to be reduced. The cost of a joint according to the invention is not as great as that of joints utilising additional components.

The meridian radius of the roller may be about 1.5 times the equatorial radius of the roller.

The configuration of the external circumferential surface of the rollers in a joint according to the invention, as a surface of revolution about the roller axis of a generally arcuate line of radius greater than the equatorial radius of the roller, means that such roller surface is, in effect, barrel-shaped. To cooperate with such roller surfaces, the opposed sides of the tracks in the first joint member cannot each be opposed part-cylindrical portions of a single cylinder whose longitudinal axis extends down the centre of the track but instead the opposed sides of each track must be portions of different cylinders whose radius is slightly greater than the radius of curvature of the generally arcuate line of which the circumferential surface of the roller is a surface of revolution about the roller axis.

The radius of curvature of each track side portion, viewed in cross-section lengthwise of the rotational axis of the first joint member, is preferably greater than or equal to 1.05 times the meridian radius of the roller.

The invention will now be described by way of example with reference to the accompanying drawings, of which:

FIGS. 4 and 5 are respectively an axial view of a further embodiment of joint in accordance with the invention and a longitudinal part-sectional view of the second joint member thereof.

Figure 1:
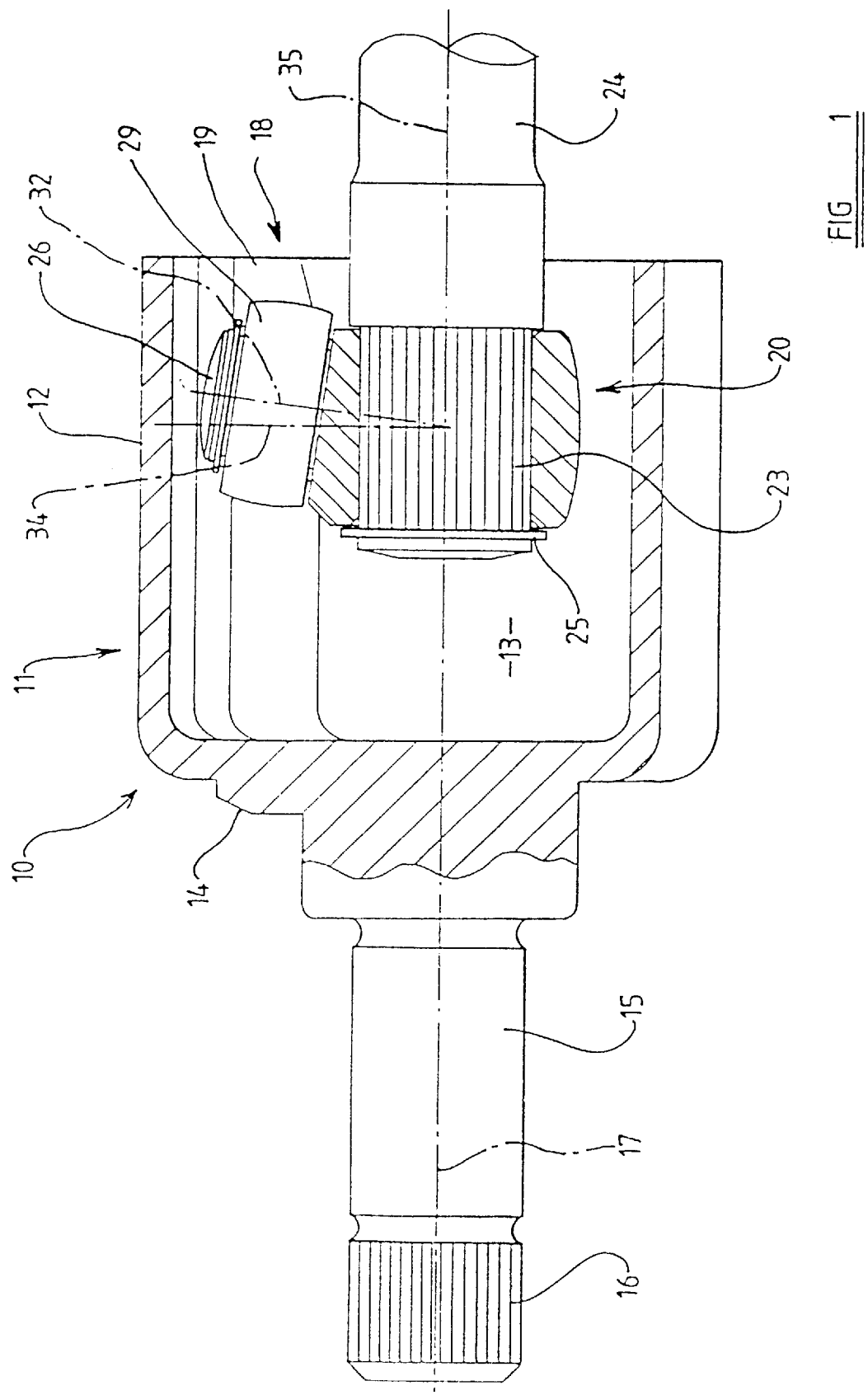
FIG. 1 is a partial section through a first embodiment of universal joint in accordance with the invention.
Figure 2:
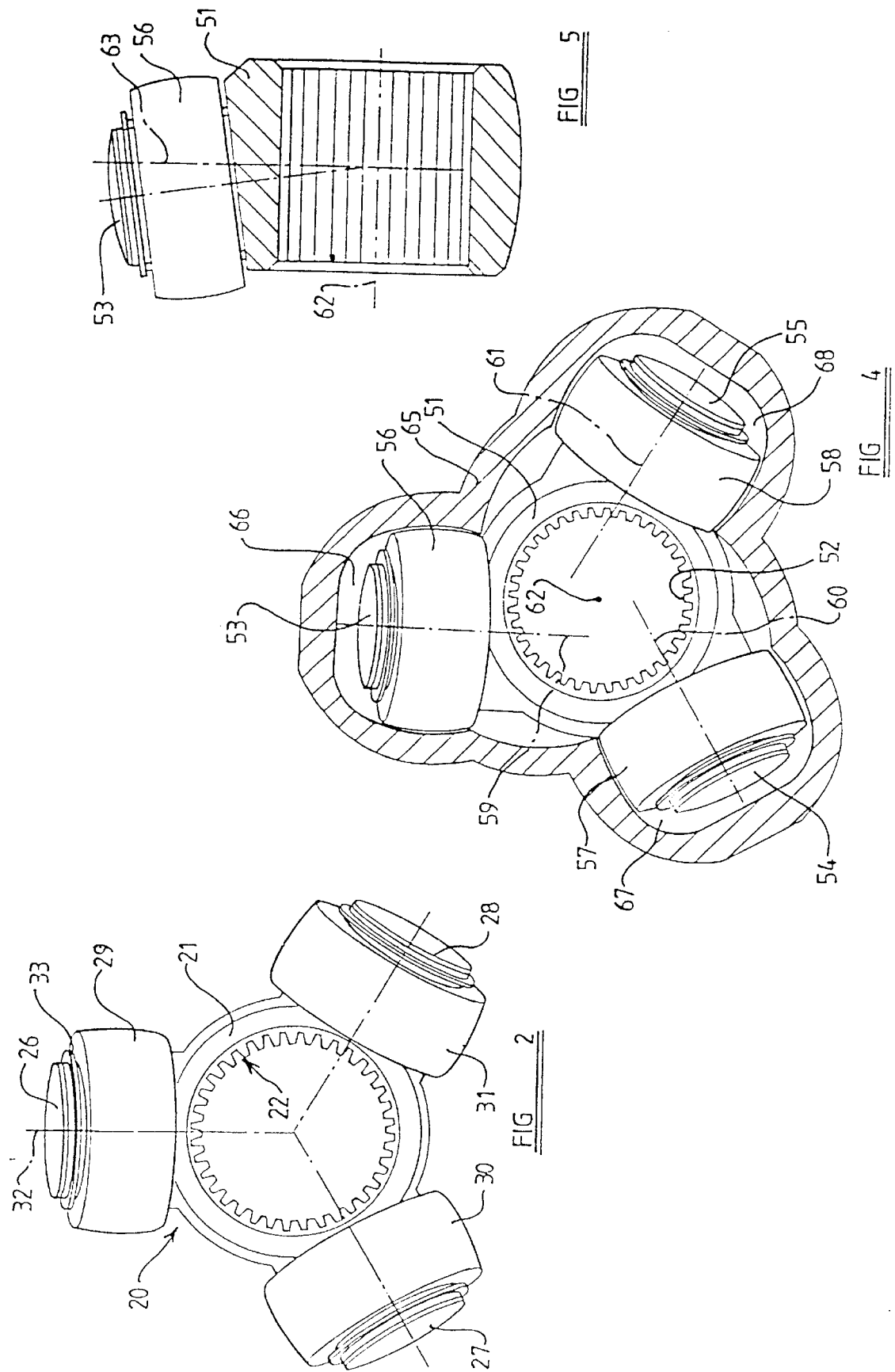
FIG. 2 is an axial view of the second joint member of the joint of FIG. 1.

Referring to FIGS. 1 and 2 of the drawings, a tripode constant velocity ratio universal joint comprises a first, outer, joint member 10 with a generally cup-shaped portion 11 having a peripheral wall 12 defining an internal cavity 13 closed at one end by a base 14 from which a stub shaft 15 extends. The stub shaft 15 has a splined portion 16 for torque transmitting engagement with another rotary component. When the joint is intended to be used, as usually is the case, in a drive shaft assembly for a motor vehicle, for driving a wheel of the vehicle, such further component will usually be an output member of a differential gearing.

The rotational axis of the joint member 10 is indicated at 17.

Within the peripheral wall 12 of the cup-shaped part 11 of joint member 10 there are provided three circumferentially spaced tracks of which one is indicated generally at 18 in FIG. 1. The tracks are equally circumferentially spaced about the joint member and extend parallel to the axis 17 thereof. Each track comprises opposed side portions described in greater detail hereafter, one of such side portions being indicated at 19 in FIG. 1.

The joint further comprises a second, inner, joint member indicated generally at 20 and shown alone in FIG. 2, the joint member 20 comprising a body 21 of annular configuration with a splined bore 22 for troque transmitting engagement with a splined end portion 23 of a drive shaft element 24. The joint member 20 is retained on the drive shaft element end portion 23 by a retaining ring 25. The joint member 20 further comprises three outwardly extending arms 26, 27, 28 which carry respective rollers 29, 30, 31. In FIG. 1, roller 29 on arm 26 is shown engaged in the track 18: the other rollers 30, 31 likewise cooperate with their corresponding tracks.

Each roller is supported (conventionally in tripode universal joints with the interposition of bearing means such as needle roller bearings), on its respective arm for movement lengthwise of the arm and also for rotation about a roller and arm axis which is indicated at 32 for the arm 26. The rollers and interposed bearings are held captive on their arms by retaining rings as indicated at 33. As clearly seen in FIG. 1, the axes as 32 of the arms as 26 are inclined to the plane indicated at 34 perpendicular to the axis of rotation 35 of the inner joint member 20 and shaft element 24: in FIG. 1 this axis 35 is coincident with the axis 17 as the joint is in the aligned (non-articulated) condition. The axes of the arms intersect the axis 35 of the joint member.

Figure 3:
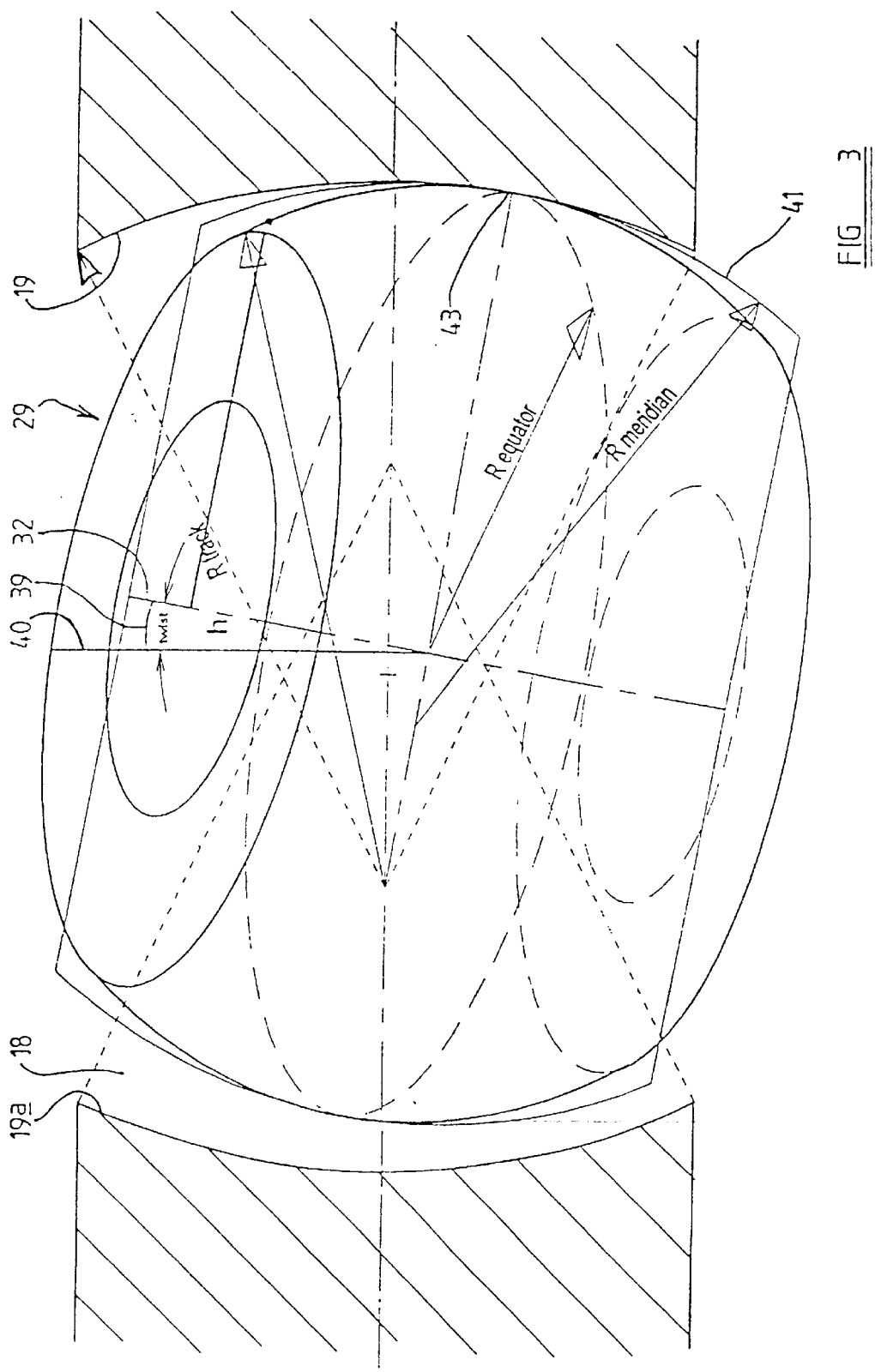
FIG. 3 is a diagram showing the configuration of the roller and track of the joint of FIG. 1.

FIG. 3 of the drawings shows in greater detail the configuration of one of the rollers of the joint and its cooperation with the associated track. In FIG. 3, the roller 29 is shown on an enlarged scale in its track 18, the surfaces of the opposed sides of the track being indicated at 19, 19a it being assumed that the joint is articulated and rotated to an angle at which the axis 32 of the arm and the roller is inclined at an indicated twist angle 39 to a line, indicated at 40, which is parallel to a plane containing the rotational axis 17 of the joint member 10.

The roller has an external circumferential surface 41 which is a surface of revolution about the roller axis 32 of a convex arcuate line whose radius of curvature indicated as $R_{meridian}$ is greater than the equatorial radius of the roller indicated as $R_{equator}$. Thus the surface 41 of the roller is somewhat barrel-shaped rather than being part-spherical as has generally been conventional hitherto.

Experiments have shown that a beneficial result can be obtained if $R_{meridian}$ is approximately $1.5 \times R_{equator}$.

The opposed sides 19, 19a of the track are parts of respective cylinders whose radius $R_{track}$ is greater than $R_{meridian}$ so that contact between roller and track side occurs theoretically at a point and in practice over a relatively small surface area centered at 43. The relationship between $R_{meridian}$ and $R_{track}$, known as the conformity therebetween, may be such that $R_{track} \div R_{meridian}$ is greater than or equal to 1.05, possibly about 1.1.

It will be noted in FIG. 3 that a clearance is shown between the external circumferential surface of the roller and the side surface 19a of the track 18. The side of the track at which such a clearance appears is of course dependent on the direction in which the joint is transmitting torque. Production tolerances require that some clearance should be present so that the roller cannot jam in its track under all conditions of joint articulation likely to be encountered in service.

Referring now to FIGS. 4 and 5 of the drawings, these show a further embodiment of joint in accordance with the invention. The second, inner, joint member, like the joint member 20 of the joint shown in FIGS. 1 and 2, comprises an annular body 51 with a splined bore 52 and three arms 53, 54, 55 extending outwardly therefrom. The arms carry respective rollers 56, 57, 58. The rollers are movably supported on the respective arms in the same manner as above described in relation to the first embodiment of joint.

The arms 53, 54, 55 have respective axes 59, 60, 61, which do not intersect the rotational axis, indicated at 62, of the joint member but instead are spaced therefrom. Further, as shown in FIG. 5, the axes 59, 60, 61 are inclined to a plane indicated at 63 perpendicular to the axis of rotation 62 of the joint member.

In this embodiment of joint, the configuration of the external circumferential surface of each roller 56, 57, 58 is as above described with reference to FIG. 3 of the drawings, and the sides of each track in the first member of the joint must analogously be shaped as above described. The outer member of the joint is indicated at 65 in FIG. 4 of the drawings and the three tracks therein at 66, 67, 68. The orientation of the tracks in the outer joint member, corresponding to the offset of the axes of the arms of the inner joint member from the rotational axis thereof is clearly visible.

In FIG. 1, the arms of the second joint member are shown inclined towards the opposite end of the shaft connected to the second joint member. For convenience, this will be referred to herein as a backwards inclination or a negative angle of inclination to the plane perpendicular to the rotational axis of the joint member. Alternatively the arms could be inclined to such plane in the opposite sense, referred to herein as a forwards inclination or a positive angle of inclination. By way of example, the inclination may be in the range −10° to +10°, and experiments have shown that a particularly beneficial result in terms of reducing third order axial force arising in operation of the joint is obtained with an angle of arm inclination in the range 8° to 9°, particularly about 8.7°.

In a further embodiment of joint according to the invention, the arms of the second joint member may have their axes offset from the axis of rotation of the joint member as above described with reference to FIGS. 4 and 5, but not inclined to the plane perpendicular to the axis of rotation.

When, herein, we refer to the meridian shape of the external surface of the rollers and to the cross-sectional shape of the track side portions as being arcuate, it is to be understood that they may in practice differ slightly from being exactly arcuate. For example, edge portions of the rollers might be chamfered.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for relising the invention in diverse forms thereof.

I claim:

1. A constant velocity ratio universal joint of the tripode type comprising: a first joint member having a first rotational axis and three tracks circumferentially spaced about said first rotational axis and extending lengthwise thereof; a second joint member having a second rotational axis and three arms extending into the respective tracks of the first joint member said arms having respective arm axes; a respective roller carried by each arm, each roller having a roller axis and an external circumferential surface which is a surface of revolution about said roller axis and which is engagable with opposite sides of the respective track in the first joint member, and which has an equatorial radius which is the greatest radius of said surface about the roller axis; each roller being constrained on the arm which it is carried for rotation about the respective arm axis and movement lengthwise thereof, and being able to tilt in the respective track it engages; wherein the external circumferential surface of each roller is a surface of revolution about the roller axis of a convex generally arcuate line having a meridian radius, said meridian radius being greater than said equatorial radius of the roller.

2. A joint according to claim 1 wherein the meridian radius of the roller is about 1.5 times the equatorial radius of the roller.

3. A joint according to claim 1 wherein each track side, as viewed in cross-section lengthwise of the rotational axis of the first joint member, is generally arcuate with a radius of curvature at least 1.05 times the meridian radius of the roller.

4. A joint according to claim 3 wherein said track side radius is 1.1 times the meridian radius of the roller.

5. A joint according to claim 1 wherein the arm axes are offset from said second rotational axis.

6. A joint according to claim 1 wherein the arm axes are inclined to a plane perpendicular to said second rotational axis.

7. A joint according to claim 6 wherein the inclination of the arms of the second joint member to said plane is in the range 8°–9°.

8. A joint according to claim 7 wherein said inclination is about 8.7°.

9. A joint according to claim 6 wherein the arm axes are offset from said second rotational axis.

* * * * *